(12) United States Patent
Hada (10) Patent No.: US 9,199,514 B2
(45) Date of Patent: Dec. 1, 2015

(54) PNEUMATIC TIRE HAVING ASYMMETRIC TREAD PATTERN

(75) Inventor: Yoshihiro Hada, Kobe (JP)

(73) Assignee: SUMITOMO RUBBER INDUSTRIES, LTD., Kobe-Shi (JP)

(*) Notice: Subject to any disclaimer, the term of this patent is extended or adjusted under 35 U.S.C. 154(b) by 1065 days.

(21) Appl. No.: 13/286,324

(22) Filed: Nov. 1, 2011

(65) Prior Publication Data

US 2012/0118455 A1    May 17, 2012

(30) Foreign Application Priority Data

Nov. 12, 2010   (JP) .................................. 2010-254105

(51) Int. Cl.
*B60C 11/03*   (2006.01)
*B60C 11/12*   (2006.01)

(52) U.S. Cl.
CPC ......... *B60C 11/0304* (2013.04); *B60C 11/1259* (2013.04); *B60C 2011/0348* (2013.04); *B60C 2011/0355* (2013.04); *B60C 2011/0358* (2013.04); *B60C 2011/0367* (2013.04); *B60C 2011/0381* (2013.04); *B60C 2011/0383* (2013.04); *B60C 2011/0388* (2013.04); *B60C 2011/0395* (2013.04); *B60C 2011/1209* (2013.04); *B60C 2011/1254* (2013.04); *B60C 2011/1268* (2013.04)

(58) Field of Classification Search
CPC ................... B60C 11/0304; B60C 2011/0383; B60C 2011/0367; B60C 2011/1209; B60C 2011/1254; B60C 11/1259; B60C 2011/1268; B60C 2011/0348; B60C 2011/0358; B60C 2011/0381; B60C 2011/0388
See application file for complete search history.

(56) References Cited

U.S. PATENT DOCUMENTS

| | | | | |
|---|---|---|---|---|
| 5,358,021 A | * | 10/1994 | Takasugi et al. | 152/209.8 |
| 2005/0121123 A1 | * | 6/2005 | Nakagawa | 152/209.9 |

(Continued)

FOREIGN PATENT DOCUMENTS

| | | | | |
|---|---|---|---|---|
| DE | 102007044435 A1 | * | 3/2009 | |
| JP | 03-067707 A | * | 3/1991 | |
| JP | 11-208217 A | * | 8/1999 | |
| JP | 2003-285610 A |   | 10/2003 | |
| JP | 2009-061985 A | * | 3/2009 | |

OTHER PUBLICATIONS

Machine translation for Japan 2009-061985 (no date).*

(Continued)

*Primary Examiner* — Steven D Maki
(74) *Attorney, Agent, or Firm* — Birch, Stewart, Kolasch & Birch, LLP (57) ABSTRACT

To make it possible to enhance uneven wear resistance while maintaining drainage performance, a pneumatic tire includes a left-right asymmetric tread pattern having a designated mounting orientation with respect to a vehicle. Vertical grooves include an inner shoulder circumferential groove disposed on an innermost side of the vehicle, and an outer shoulder circumferential groove disposed on an outermost side of the vehicle. Lateral grooves include inner shoulder lateral grooves and outer shoulder lateral grooves. The inner shoulder lateral groove includes a first inner shoulder lateral groove which extends inward in a tire axial direction from an outer side of a vehicle-inner side tread edge and terminates without reaching the inner shoulder circumferential groove, and a second inner shoulder lateral groove which extends inward in the tire axial direction from an outer side of the vehicle-inner side tread edge and opens in the inner shoulder circumferential groove.

14 Claims, 5 Drawing Sheets

(56) References Cited

U.S. PATENT DOCUMENTS

2005/0269004 A1    12/2005  Miyabe et al.
2007/0272337 A1*   11/2007  Bovaird et al. .......... 152/209.18
2010/0212795 A1*    8/2010  Murata .................... 152/209.18
2013/0133797 A1*    5/2013  Takagi ....................... 152/209.8

OTHER PUBLICATIONS

Machine translation for Japan 11-208217 (no date).*
Derwent abstract for Japan 03-067707 (no date).*
Machine translation for German 102007044435 (no date).*

* cited by examiner

PNEUMATIC TIRE HAVING ASYMMETRIC TREAD PATTERN

BACKGROUND OF THE INVENTION

1. Field of the Invention

The present invention relates to a pneumatic tire capable of enhancing uneven wear resistance while maintaining drainage performance.

2. Description of the Background Art

There is conventionally proposed a pneumatic tire in which a tread portion is provided with a circumferential groove extending in a tire circumferential direction and a lateral groove extending in a direction intersecting with the circumferential groove (see Japanese Patent Application Publication No. 2003-285610, for example). According to such a pneumatic tire, the circumferential groove and the lateral groove can smoothly guide a water film interposed between a road surface and a tread surface, and drainage performance can be enhanced.

According to the pneumatic tire, to further enhance the drainage performance, the lateral groove is connected with the circumferential groove, and water in the circumferential groove is guided to an outer side in a tire axial direction through the lateral groove.

SUMMARY OF THE INVENTION

If the lateral groove is connected with the circumferential groove, however, there is a problem that tread rigidity at that portion is deteriorated and uneven wear is prone to be generated at shoulder portions of a tread portion on both outer sides in the tire axial direction where a ground-contact pressure is increased at the time of cornering. There is a tendency that the uneven wear is prone to be generated on an outer side of a vehicle where the ground-contact pressure at the time of cornering is large compared with on an inner side.

The present invention has been accomplished in view of the above circumstances, and a basic structure of the invention includes an inner shoulder lateral groove having a first inner shoulder lateral groove which terminates without reaching an inner shoulder circumferential groove and a second inner shoulder lateral groove which opens in the inner shoulder circumferential groove, and an outer shoulder lateral groove which terminates without reaching an outer shoulder circumferential groove. Based on this, it is a main object of the invention to provide a pneumatic tire capable of enhancing uneven wear resistance while maintaining drainage performance.

The pneumatic tire of the present invention comprises a tread portion provided with a left-right asymmetric tread pattern having a designated mounting orientation with respect to a vehicle, and having a vehicle-inner side tread edge and a vehicle-outer side tread edge, the left-right asymmetric tread pattern comprising at least two circumferential grooves extending in a tire circumferential direction, and lateral grooves extending crosswise to the tire circumferential direction, and the at least two circumferential grooves including an inner shoulder circumferential groove disposed on an innermost side of the tread portion with respect to the vehicle, and an outer shoulder circumferential groove disposed on an outermost side of the tread portion with respect to the vehicle.

The lateral grooves include inner shoulder lateral grooves extending between the inner shoulder circumferential groove and the vehicle-inner side tread edge, and outer shoulder lateral grooves extending between the outer shoulder circumferential groove and the vehicle-outer side tread edge.

The inner shoulder lateral grooves are first inner shoulder lateral grooves extending from an outer side of the vehicle-inner side tread edge toward the inner shoulder circumferential groove and terminating without reaching the inner shoulder circumferential groove, and second inner shoulder lateral grooves extending from an outer side of the vehicle-inner side tread edge to the inner shoulder circumferential groove so as to open to the inner shoulder circumferential groove.

The outer shoulder lateral grooves extend from an outer side of the vehicle-outer side tread edge towards the outer shoulder circumferential groove and terminating without reaching the outer shoulder circumferential groove.

In this specification, unless otherwise specified, sizes of various portions of a tire are values specified in a normal state where the tire is mounted around a standard rim and a standard internal pressure is charged into the tire.

The "standard rim" is a rim determined for each tire by a specification standard including a specification on which the tire is based, and is a standard rim specified in JATMA, a "Design Rim" in TRA, and a "Measuring Rim" in ETRTO.

The "standard internal pressure" is an air pressure determined for each tire by the specification, and is a maximum air pressure specified in JATMA, a maximum value described in "TIRE LOAD LIMITS AT VARIOUS COLD INFLATION PRESSURES" in TRA, and "INFLATION PRESSURE" in ETRTO. When the tire is for a passenger vehicle, the standard internal pressure is 180 kPa across the board.

According to a pneumatic tire of the invention, a tread portion thereof is provided with at least two circumferential grooves extending in a tire circumferential direction, and lateral grooves extending in a direction intersecting with the circumferential grooves, and the pneumatic tire includes a left-right asymmetric tread pattern having a designated mounting orientation with respect to a vehicle.

The circumferential grooves include an inner shoulder circumferential groove disposed on an innermost side of the vehicle, and an outer shoulder circumferential groove disposed on an outermost side of the vehicle. The lateral grooves include inner shoulder lateral grooves extending between the inner shoulder circumferential groove and a vehicle-inner side tread edge, and outer shoulder lateral grooves extending between the outer shoulder circumferential groove and a vehicle-outer side tread edge.

The inner shoulder lateral grooves include first inner shoulder lateral grooves which extend inward in a tire axial direction from an outer side of the vehicle-inner side tread edge and terminate without reaching the inner shoulder circumferential groove, and second inner shoulder lateral grooves which extend inward in the tire axial direction from an outer side of the vehicle-inner side tread edge and open in the inner shoulder circumferential groove. Since the first inner shoulder lateral groove terminates without reaching the inner shoulder circumferential groove, it is possible to suppress the deterioration of the tread rigidity of a shoulder portion on an inner side of a vehicle, and to enhance the uneven wear resistance. Since the second inner shoulder lateral groove is connected with the inner shoulder circumferential groove, it is possible to smoothly guide water in the inner shoulder circumferential groove toward an inner side of the vehicle, and to exert drainage performance.

The outer shoulder lateral groove extends inward in the tire axial direction from an outer side of the vehicle-outer side tread edge and terminates without reaching the outer shoulder circumferential groove. Such an outer shoulder lateral groove can form a tread portion on an outer side of the vehicle where a ground-contact pressure at the time of cornering becomes maximum into a rib shape which is continuous in a tire circumferential direction, and the uneven wear resistance can be enhanced. Therefore, the pneumatic tire of the invention can enhance the uneven wear resistance while maintaining drainage performance.

DESCRIPTION OF THE PREFERRED EMBODIMENTS

An embodiment of the present invention will be described below on the basis of drawings.

Figure 1:
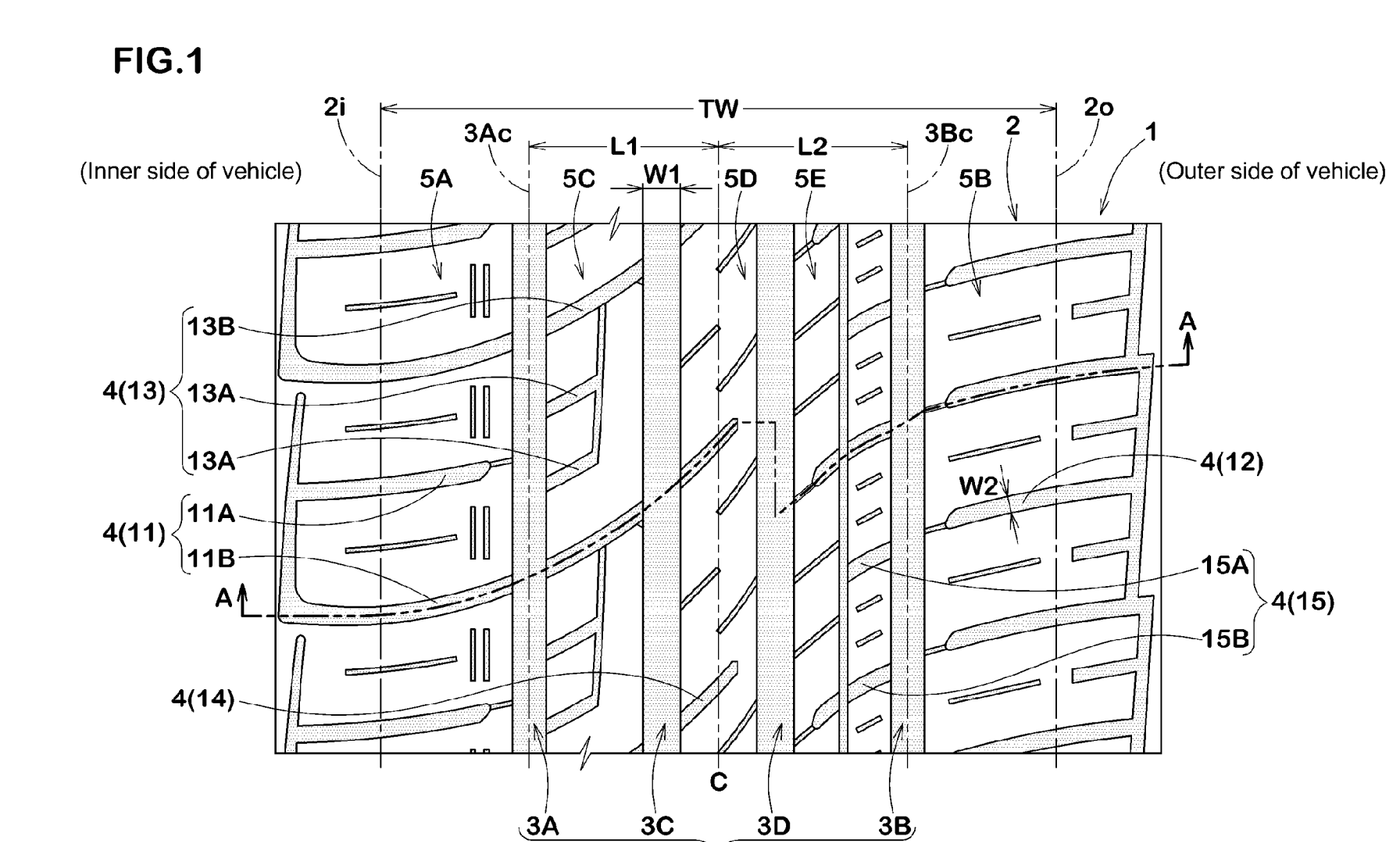
FIG. 1 is a development view of a tread portion of a pneumatic tire according to an embodiment.
Figure 2:
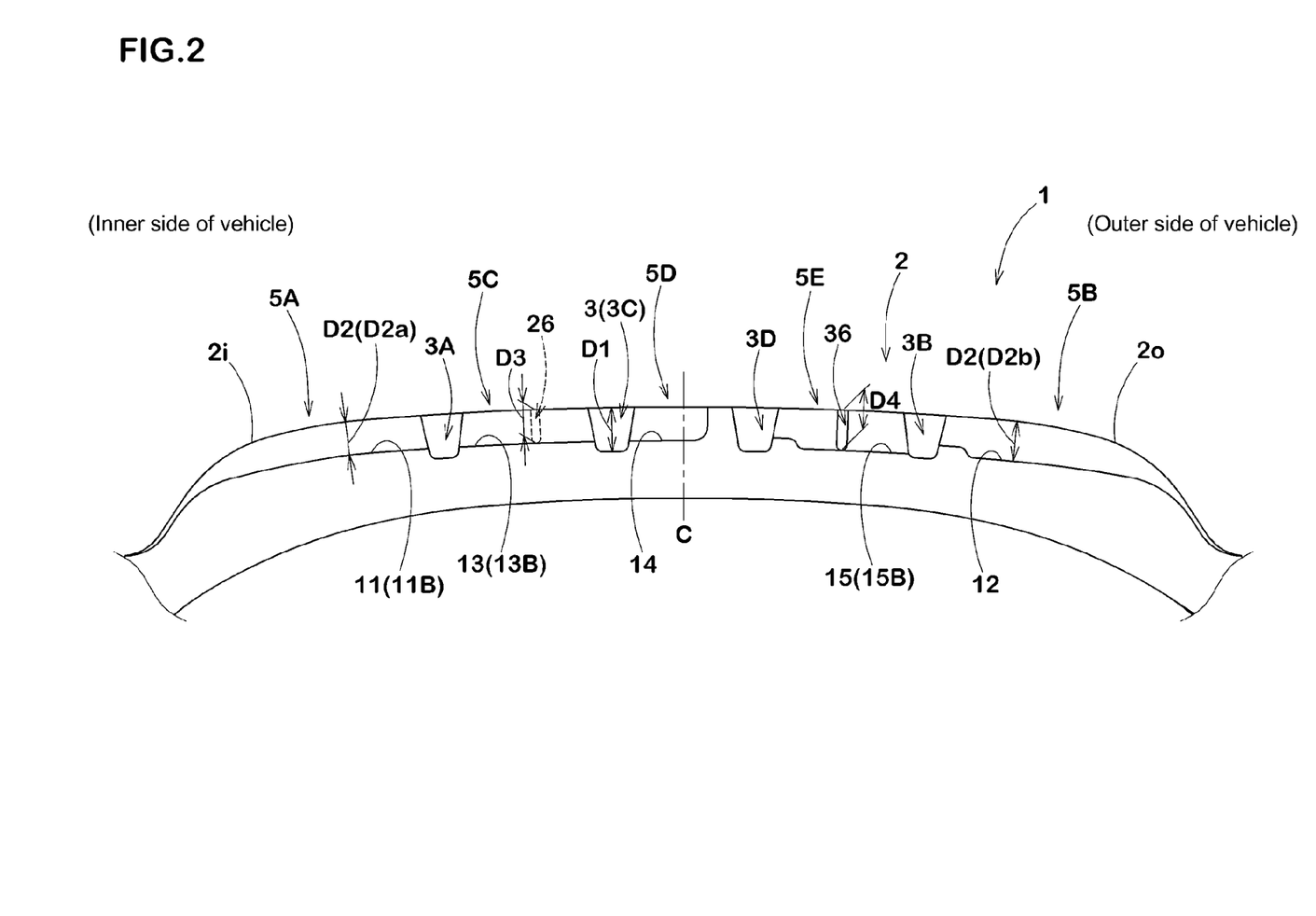
FIG. 2 is a sectional view taken along the line A-A in FIG. 1.

As shown in FIGS. 1 and 2, a pneumatic tire (hereinafter, also referred to simply as "tire") 1 according to the present embodiment is provided in a tread portion 2 with circumferential grooves 3 extending in a tire circumferential direction, and lateral grooves 4 extending crosswise to the circumferential direction. The pneumatic tire 1 comprises the tread portion provided with a left-right asymmetric tread pattern having a designated mounting orientation with respect to a vehicle. The pneumatic tire 1 is configured as a summer tire for a passenger vehicle.

The mounting orientation with respect to the vehicle is clearly indicated by characters (e.g., "INSIDE" and/or "OUTSIDE") on a sidewall portion of the tire 1 (not shown).

The number of the circumferential grooves 3 is at least two (four in this embodiment), and the circumferential grooves 3 are formed as straight grooves which straightly extend along a tire circumferential direction. Such a straight groove can smoothly guide a water film interposed between a road surface and a tread surface in the tire circumferential direction when the vehicle runs straightly or corners, and can enhance drainage performance. It is preferable that a groove width W1 of the circumferential groove 3 is set to about 3.5 to 6.5% of a tread width TW, and a groove depth D1 is set to about 4 to 4.8% of the tread width TW. The tread width TW is a tire axial distance between tread edges 2i and 2o in the normal state.

The circumferential grooves 3 include an inner shoulder circumferential groove 3A disposed on an innermost side of the vehicle, an outer shoulder circumferential groove 3B disposed on an outermost side of the vehicle, an inner center circumferential groove 3c extending between the tire equator C and the inner shoulder circumferential groove 3A, and an outer center circumferential groove 3D extending in the tire circumferential direction between the tire equator C and the outer shoulder circumferential groove 3B.

These circumferential grooves 3A, 3B, 3C and 3D divide the tread portion 2 into the following five land portions. That is, five land portions are an inner shoulder land portion 5A defined by the inner shoulder circumferential groove 3A and the vehicle-inner side tread edge 2i, an outer shoulder land portion 5B defined by the outer shoulder circumferential groove 3B and the vehicle-outer side tread edge 2o, an inner middle land portion 5c defined by the inner center circumferential groove 3C and the inner shoulder circumferential groove 3A, a center land portion 5D defined by the inner center circumferential groove 3C and the outer center circumferential groove 3D, and an outer middle land portion 5E defied by the outer center circumferential groove 3D and the outer shoulder circumferential groove 3B.

It is preferable that the inner shoulder circumferential groove 3A and the outer shoulder circumferential groove 3B are disposed closer to the tire equator C as compared with a conventional tire. Such inner shoulder circumferential groove 3A and outer shoulder circumferential groove 3B can exert the drainage performance when the vehicle corners and runs straightly, widths of the inner and outer shoulder land portions 5A and 5B are widened, thereby enhancing the tread rigidity in the lateral direction, and uneven wear resistance and the steering stability can be enhanced. It is preferable that a distance L1 between the tire equator C and a groove center line 3Ac of the inner shoulder circumferential groove 3A, and a distance L2 between the tire equator C and a groove center line 3Bc of the outer shoulder circumferential groove 3B are about 23.5 to 28.5% of the tread width TW for example.

The lateral grooves 4 includes an inner shoulder lateral groove 11 provided in the inner shoulder land portion 5A, an outer shoulder lateral groove 12 provided in the outer shoulder land portion 5B, an inner middle lateral groove 13 provided in the inner middle land portion 5C, a center lateral groove 14 provided in the center land portion 5D, and an outer middle lateral groove 15 provided in the outer middle land portion 5E.

These lateral grooves 11, 12, 13, 14 and 15 can guide the water film in the tire axial direction, and can enhance the drainage performance. It is preferable that a groove width W2 of the lateral groove 4 is set to about 1.3 to 2.5% of the tread width TW and a groove depth D2 is set to about 2.7 to 4.6% of the tread width TW.

Figure 3:
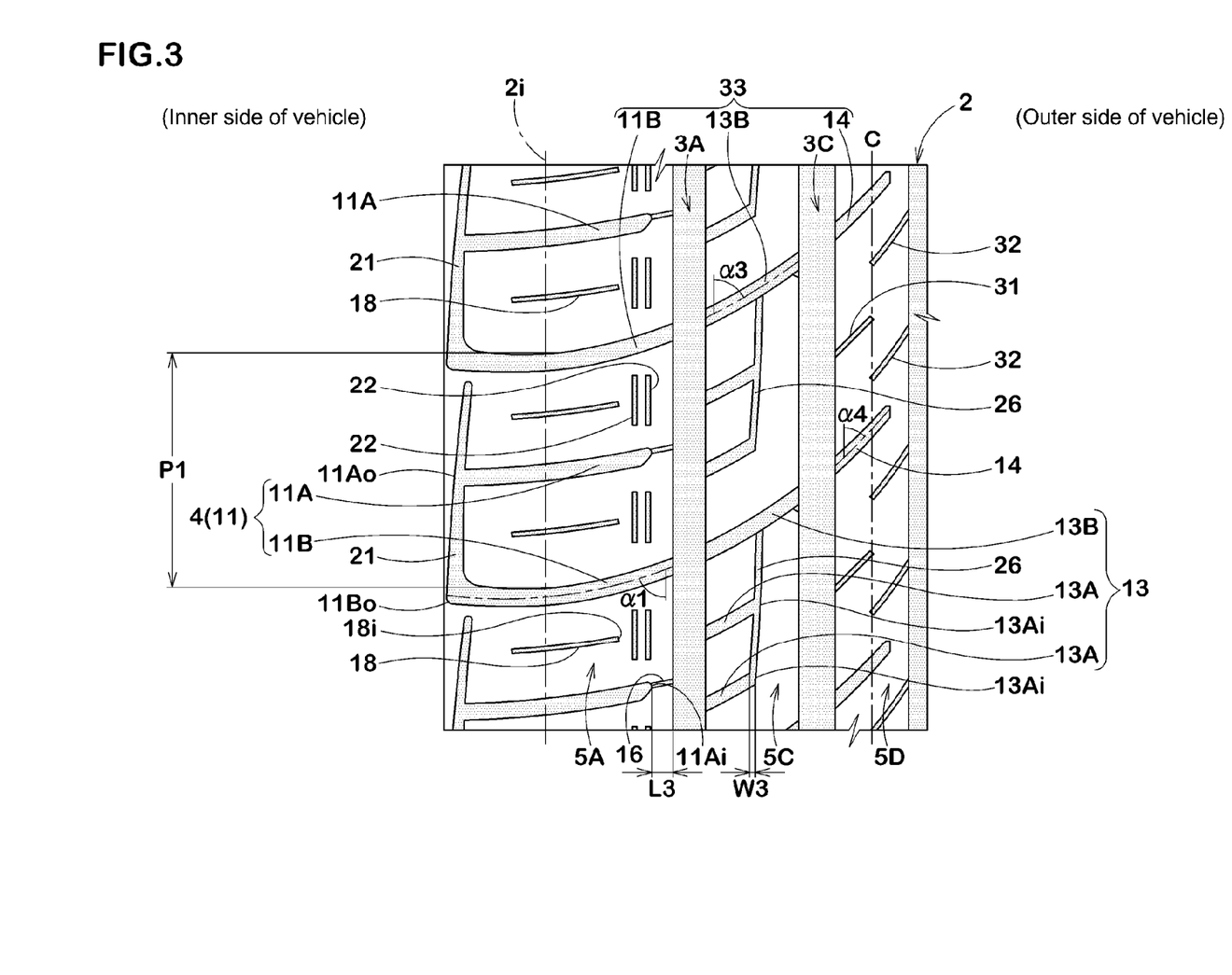
FIG. 3 is a partial enlarged view of an inner side of a vehicle shown in FIG. 1.

As shown in FIG. 3 in a close-up manner, the inner shoulder lateral groove 11 of this embodiment smoothly inclines and extends between the inner shoulder circumferential groove 3A and the vehicle-inner side tread edge 2i while gradually increasing an angle α1 with respect to the tire circumferential direction. Such an inner shoulder lateral groove 11 can smoothly drain the water film toward the vehicle-inner side tread edge 2i. It is preferable that the angle α1 is about 65 to 80°.

The inner shoulder lateral groove 11 of the embodiment includes a first inner shoulder lateral groove 11A whose inner end 11Ai in the tire axial direction terminates without reaching the inner shoulder circumferential groove 3A, and a second inner shoulder lateral groove 11B which opens in the inner shoulder circumferential groove 3A.

Such a first inner shoulder lateral groove 11A can suppress the deterioration in the tread rigidity of the inner shoulder land portion 5A, and can enhance the uneven wear resistance. The second inner shoulder lateral groove 11B can take in water into the inner shoulder circumferential groove 3A and smoothly guide the water toward the vehicle-inner side tread edge 2i, and can enhance the drainage performance.

Figure 4:
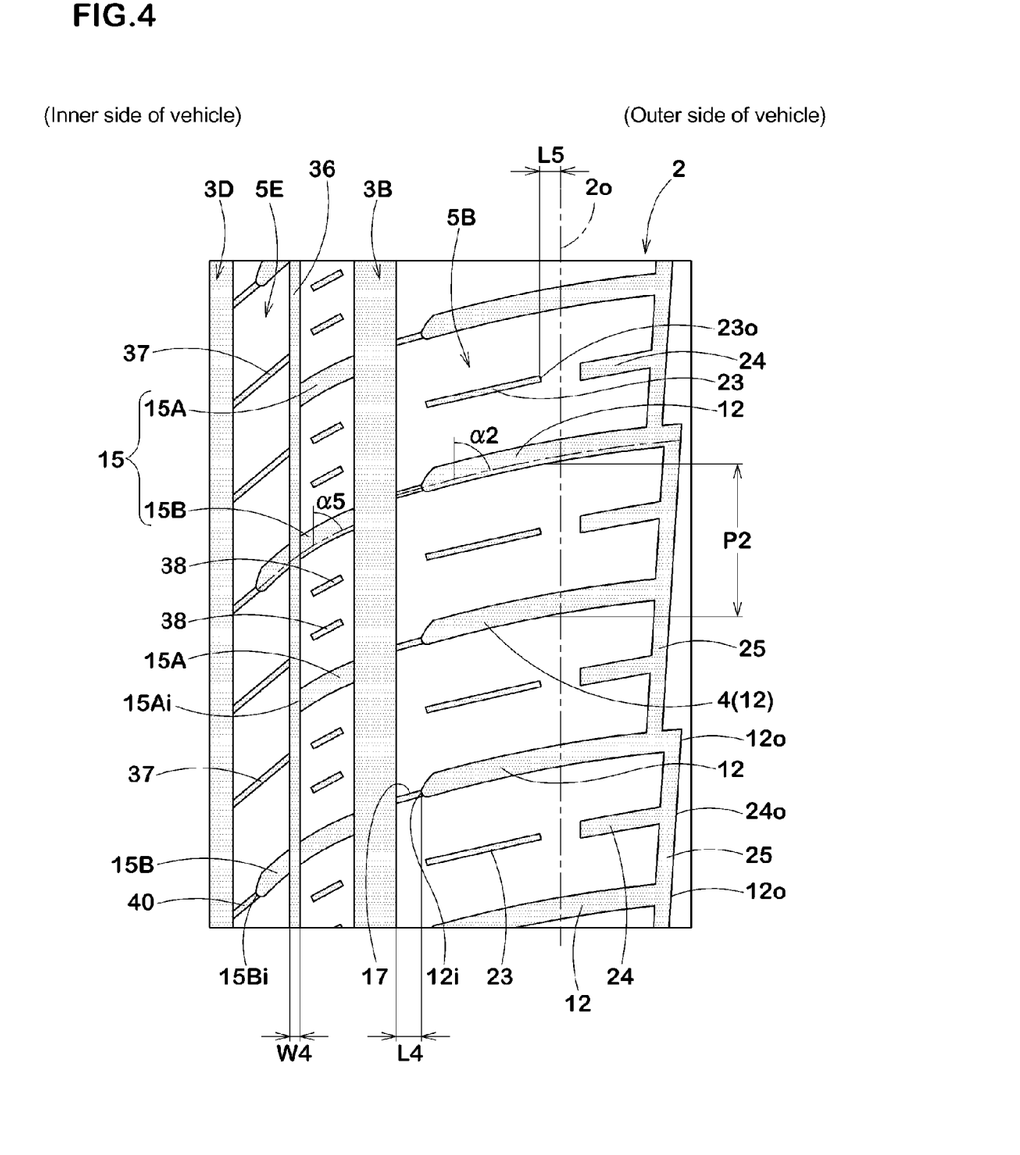
FIG. 4 is a partial enlarged view of an outer side of the vehicle shown in FIG. 1.

As shown in FIG. 4 in a close-up manner, the outer shoulder lateral groove 12 extends between the outer shoulder circumferential groove 3B and a vehicle-outer side tread edge 2o while gradually reducing an angle α2 with respect to the tire circumferential direction. Such an outer shoulder lateral groove 12 can also smoothly guide the water film to the vehicle-outer side tread edge 2o like the inner shoulder circumferential groove 3A. It is preferable that the angle α2 is about 70 to 85°.

An inner end 12i of the outer shoulder lateral groove 12 of the embodiment in the tire axial direction terminates without reaching the outer shoulder circumferential groove 3B. According to this, the outer shoulder lateral groove 12 forms the outer shoulder land portion 5B where the ground-contact pressure at the time of cornering becomes maximum into substantially a rib-shape, the tread rigidity can be enhanced, thereby enhancing wear resistance and H/T wear resistance.

since the inner shoulder lateral groove 11 and the outer shoulder lateral groove 12 of the tire 1 of the embodiment are configured as described above, it is possible to enhance the uneven wear resistance while maintaining the drainage performance. The second inner shoulder lateral groove 11B opens in the inner shoulder circumferential groove 3A to enhance the drainage performance. Since the inner shoulder land portion 5A provided with the second inner shoulder lateral groove 11B has a relatively small ground-contact pressure as compared with the outer shoulder land portion 5B at the time of cornering, it is possible to suppress the deterioration in the uneven wear resistance while enhancing the drainage performance.

To effectively exert the effect, the shortest distance L3 between the inner shoulder circumferential groove 3A and the inner end 11Ai of the first inner shoulder lateral groove 11A on the side of the tire equator is preferably 1.5% or more of the tread width TW (shown in FIG. 1), and more preferably 3% or more. If the shortest distance L3 becomes small, the rigidity of the inner shoulder land portion 5A is deteriorated, and there is a possibility that the uneven wear resistance is deteriorated. If the shortest distance L3 becomes large on the contrary, the first inner shoulder lateral groove 11A becomes excessively short and there is a possibility that the drainage performance is deteriorated. From such a viewpoint, the shortest distance L3 is preferably 6% or less of the tread width TW, and more preferably 5% or less.

From the same viewpoint, the shortest distance L4 between the outer shoulder circumferential groove 3B and the inner end 12i of the outer shoulder lateral groove 12 on the side of the tire equator is preferably 1.5% or more of the tread width TW (shown in FIG. 1), more preferably 3% or more, and preferably 6.5% or less, and more preferably 5.5% or less.

As shown in FIG. 2, a groove depth D2a of the inner shoulder lateral groove 11 is preferably smaller than a groove depth D2b of the outer shoulder lateral groove 12. According to this, the tread portion 2 can enhance the tread rigidity of the inner shoulder land portion 5A having smaller tread rigidity than that of the outer shoulder land portion 5B, and can substantially uniform the tread rigidities of the land portions 5A and 5B, and can enhance the uneven wear resistance and the steering stability.

In this case, the groove depth D2a of the inner shoulder lateral groove 11 is preferably 100% or less of the groove depth D2b of the outer shoulder lateral groove 12, and more preferably 95% or less. If the groove depth D2a is large, there is a possibility that the effect cannot be expected. If the groove depth D2a becomes small on the contrary, there is a possibility that the drainage performance of the inner shoulder lateral groove 11 is deteriorated. From such a viewpoint, the groove depth D2a is preferably 85% or more of the groove depth D2b, and more preferably 90% or more.

As shown in FIG. 3, it is preferable that the inner shoulder land portion 5A is provided with an inner shoulder short sipe 16 which connects the inner end 11Ai of the first inner shoulder lateral groove 11A and the inner shoulder circumferential groove 3A. Such an inner shoulder short sipe 16 can moderate distortion generated between the first inner shoulder lateral groove 11A and the inner shoulder circumferential groove 3A, and effectively exert the uneven wear resistance. From the same viewpoint, it is preferable that the outer shoulder land portion 5B is provided with an outer shoulder short sipe 17 which connects the inner end 12i of the outer shoulder lateral groove 12 and the outer shoulder circumferential groove 3B as shown in FIG. 4.

As shown in FIG. 3, the inner shoulder land portion 5A is provided with an inner shoulder sipe 18 between the first inner shoulder lateral groove 11A and the second inner shoulder lateral groove 11B. The inner shoulder sipe 18 extends inward of the vehicle, from a position separated inward of the vehicle from the inner shoulder circumferential groove 3A beyond the vehicle-inner side tread edge 2i, and terminates. Such an inner shoulder sipe 18 can moderate distortion when the inner shoulder land portion 5A comes into contact with the ground, and can further enhance the uneven wear resistance.

It is preferable that the inner shoulder land portion 5A is provided with two circumferential sipes 22. The circumferential sipes 22 extend in the tire circumferential direction between the inner shoulder circumferential groove 3A and an inner end 18i of the inner shoulder sipe 18 in the tire axial direction, and both ends of the circumferential sipes 22 terminate without intersecting the first and second inner shoulder lateral grooves 11A and 11B. Such circumferential sipes 22 effectively moderate lateral distortion applied to the inner shoulder land portion 5A when the vehicle corners. It is possible to further enhance the uneven wear resistance of the inner shoulder land portion 5A to which forces in various directions are applied in cooperation with the inner shoulder sipe 18.

It is preferable that the tread portion 2 is provided with an inner shoulder-connecting groove 21 which connects a vehicle-inner side outer end 11Bo of the second inner shoulder lateral groove 11B and a vehicle-inner side outer end 11Ao of the first inner shoulder lateral groove 11A which is adjacent to the vehicle-inner side outer end 11Bo in the tire circumferential direction, and further extends in the tire circumferential direction. Such an inner shoulder-connecting groove 21 can effectively moderate distortion of the inner shoulder land portion 5A, and can further enhance the uneven wear resistance.

As shown in FIG. 4, the outer shoulder land portion 5B is provided with an outer shoulder sipe 23 between the outer shoulder lateral grooves 12 which are adjacent to each other in the tire circumferential direction. The outer shoulder sipes 23 extends outward of the vehicle from a position separated outward of the vehicle from the outer shoulder circumferential groove 3B. The outer shoulder sipe 23 terminates without reaching the vehicle-outer side tread edge 2o. Such an outer shoulder sipe 23 can effectively moderate distortion generated in the outer shoulder land portion 5B, and can further enhance the uneven wear resistance. Since the outer shoulder sipe 23 terminates without reaching the vehicle-outer side tread edge 2o, it is possible to effectively suppress the H/T wear which is prone to be generated on the tread edge 2o.

To effectively exert such an effect, a distance L5 between a vehicle-outer side outer end 23o of the outer shoulder sipe 23 and the vehicle-outer side tread edge 2o is preferably 1.5 mm or more, and more preferably 3 mm or more. If the distance L5 becomes small, there is a possibility that the H/T wear cannot sufficiently be suppressed. If the distance L5 becomes large on the contrary, there is a possibility that distortion generated in the outer shoulder land portion 5B cannot sufficiently be moderated. From such a viewpoint, the distance L5 is preferably 8 mm or less, and more preferably 6 mm or less.

The outer shoulder land portion 5B is provided with outer shoulder slots 24 which extend outward of the vehicle from positions separated outward of the vehicle from the vehicle-outer side tread edge 2o. The outer shoulder slots 24 of the embodiment are provided on the outer side of the vehicle compared with the outer shoulder sipes 23. The outer shoulder slots 24 can effectively moderate distortion generated in the outer shoulder land portion 5B, and can preferably enhance the uneven wear resistance. Since the outer shoulder slots 24 are provided at positions separated outward of the vehicle from the tread edge 2o, it is possible to effectively suppress the H/T wear.

The tread portion 2 is provided with outer shoulder-connecting grooves 25 which extend in the tire circumferential direction from a vehicle-outer side outer end 12o of the outer shoulder lateral groove 12 on the outer side of the vehicle-outer side tread edge 2o with respect to the vehicle. The outer shoulder-connecting grooves 25 connect outer ends 24o of the outer shoulder slots 24 and outer ends 12o of the outer shoulder lateral grooves 12 which are adjacent to each other in the tire circumferential direction. Such outer shoulder-connecting grooves 25 also can effectively moderate distortion generated in the outer shoulder land portion 5B.

As shown in FIG. 3, the inner middle lateral groove 13 inclines at an angle α3 with respect to the tire circumferential direction which is smaller than the angle α1 of the inner shoulder lateral groove 11, and extends between the inner shoulder circumferential groove 3A and the inner center circumferential groove 3c. Such an inner middle lateral groove 13 can smoothly guide a water film interposed between a road surface and the inner middle land portion 5c which comes into contact with the ground when the vehicle runs straightly or corners, and can enhance the drainage performance. The angle α3 is preferably about 55 to 65°.

The inner middle lateral grooves 13 include first inner middle lateral grooves 13A which extend inward in the tire circumferential direction from the inner shoulder circumferential groove 3A and terminate without reaching the inner center circumferential groove 3c, and second inner middle lateral grooves 13B which extend inward in the tire axial direction from the inner shoulder circumferential groove 3A and open in the inner center circumferential groove 3c. Two first inner middle lateral grooves 13A are provided between the second inner middle lateral grooves 13B which are adjacent to each other in the tire circumferential direction. The inner middle lateral grooves 13 are arranged such that the installation number of the long second inner middle lateral grooves 13B is smaller than the installation number of the short first inner middle lateral grooves 13A. According to this, it is possible to enhance the drainage performance without excessively deteriorating the tread rigidity of the inner middle land portion 5C.

Inner middle thin grooves 26 are formed in the inner middle land portion 5c. The inner middle thin grooves 26 are in communication with tire axial inner ends 13Ai of the first inner middle lateral grooves 13A, extend in the tire circumferential direction, and open in the second inner middle lateral grooves 13B. Such an inner middle thin groove 26 can smoothly guide the water film in the tire circumferential direction, discharge the water film from the first inner middle lateral groove 13A into the inner shoulder circumferential groove 3A, and is of help to enhance the drainage performance. The inner middle thin groove 26 preferably has a groove width W3 of 0.5 to 1.5% of the tread width TW, and a groove width D3 of 0.5 to 1.3% of the tread width TW.

The center lateral groove 14 extends from the inner center circumferential groove 3C beyond the tire equator C and terminates without reaching the outer center circumferential groove 3D. The center lateral groove 14 inclines at an angle α4 with respect to the tire circumferential direction and extends. The angle α4 is smaller than the angle α3 of the inner middle lateral groove 13 and the angle α1 of the inner shoulder lateral groove 11. Such a center lateral groove 14 can guide, to the inner center circumferential groove 3c, a water film interposed between a road surface and the center land portion 5D having the highest ground-contact pressure when the vehicle runs straightly. The angle α4 is preferably about 35 to 50°.

The center land portion 5D is provided with first center sipes 31 which extend tire-axially inward from the inner center circumferential groove 3c and terminate near the tire equator C, and second center sipes 32 which extend tire-axially inward from the outer center circumferential groove 3D and terminate near the tire equator C. One first center sipe 31 and two second center sipes 32 are provided between the center lateral grooves 14 which are adjacent to each other in the tire circumferential direction. According to this, it is possible for the center land portion 5D to substantially uniform the tread rigidity in the tire axial direction, enhance the uneven wear resistance, enhance the ground-contact performance, and enhance the straight running stability.

In this embodiment, the second inner shoulder lateral groove 11B, the inner middle lateral groove 13 (second inner middle lateral groove 13B in the embodiment) and the center lateral groove 14 are formed as an inner long lateral groove 33 which is smoothly continuous through the inner center circumferential groove 3C and the inner shoulder circumferential groove 3A. Such an inner long lateral groove 33 can smoothly guide a water film from the tire equator C toward the vehicle-inner side tread edge 2i, and largely enhance the drainage performance. Further, since the inner long lateral groove 33 is provided on the inner side of the vehicle where the ground-contact pressure is relatively small compared with the outer side of the vehicle, it is possible to avoid a case in which the vehicle-outer side tread surface having a large ground-contact pressure is worn over a wide range as in the past, and to suppress the deterioration of the uneven wear resistance.

As shown in FIGS. 3 and 4, it is preferable that an installation pitch P1 of the inner long lateral groove 33 is larger than an installation pitch P2 of the outer shoulder lateral groove 12. According to this, it is possible to prevent the vehicle-inner side tread rigidity from being excessively deteriorated, and to enhance the uneven wear resistance. The installation pitches P1 and P2 should be measured at the vehicle-inner side tread edge 2i or the vehicle-outer side tread edge 2o.

It is preferable that the installation pitch P1 of the inner long lateral groove 33 is 170% or more of the installation pitch P2 of the outer shoulder lateral groove 12, and more preferably 185% or more. If the installation pitch P1 becomes small, there is a possibility that the vehicle-inner side tread rigidity is excessively deteriorated. If the installation pitch P1 becomes large on the contrary, there is a possibility that the enhancement of the drainage performance cannot be expected. From such a viewpoint, the installation pitch P1 is preferably 220% or less of the installation pitch P2, and more preferably 210% or less.

As shown in FIG. 4, the outer middle lateral groove 15 extends between the outer shoulder circumferential groove 3B and the outer center circumferential groove 3D, inclines at an angle α5 with respect to the tire circumferential direction and extends. The angle α5 is smaller than the angle α2 of the outer shoulder lateral groove 12. The outer middle lateral groove 15 also can smoothly guide a water film interposed between a road surface and the outer middle land portion 5E which comes into contact with the ground when a vehicle runs straightly and corners, and the outer middle lateral groove 15 can enhance the drainage performance. The angle α5 is preferably about 45 to 65°.

The outer middle lateral grooves 15 include a first outer middle lateral groove 15A which extends inward in the tire axial direction from the outer shoulder circumferential groove 3B and terminates without reaching the outer center circumferential groove 3D, and a second outer middle lateral groove 15B which extends inward in the tire axial direction from the outer shoulder circumferential groove 3B and terminates on an inner side of the first outer middle lateral groove 15A in the tire axial direction. The first and second outer middle lateral grooves 15A and 15B are adjacent to each other in the tire circumferential direction.

The first outer middle lateral groove 15A and the second outer middle lateral groove 15B are provided at a position where they are smoothly connected to the outer shoulder lateral groove 12 through the outer shoulder circumferential groove 3B. According to this, the first and second outer middle lateral grooves 15A and 15B can guide the water film to the outer shoulder lateral groove 12 and can discharge the water film to the vehicle-outer side tread edge 2o.

The outer middle land portion 5E is provided with an outer middle thin groove 36 which continuously extends in the tire circumferential direction through a tire axial inner end 15Ai of the first outer middle lateral groove 15A, and longitudinally passes through the second outer middle lateral groove 15B. Since such an outer middle thin groove 36 can guide the water film in the tire circumferential direction and discharge the water film to the first and second outer middle lateral grooves 15A and 15B, the outer middle thin groove 36 is of help to enhance the drainage performance. The outer middle thin groove 36 preferably has a groove width W4 of about 0.5 to 1.5% of the tread width TW for example, and a groove depth D4 (shown in FIG. 2) of about 0.5 to 1% of the tread width TW.

The outer middle land portion 5E is provided with first outer middle sipes 37 which incline substantially at the same angle as that of the outer middle lateral groove 15 and extend between the outer center circumferential groove 3D and the outer middle thin groove 36, and second outer middle sipes 38 which incline substantially at the same angle as that of the outer middle lateral groove 15 and extend from a position separated inward in the tire axial direction from the outer shoulder circumferential groove 3B. The second outer middle sipes 38 terminate without reaching the outer middle thin groove 36. The first outer middle sipes 37 are provided between the second outer middle lateral grooves which are adjacent to each other in the tire circumferential direction, and the number of the first outer middle sipes 37 is smaller than that of the second outer middle sipes 38 by two. According to this, the outer middle land portion 5E can substantially uniform tread rigidities of the vehicle-inner side region and the vehicle-outer side region where the tread rigidities are prone to be deteriorated by the second outer middle lateral groove 15B, and can enhance the uneven wear resistance.

It is preferable that the outer middle land portion 5E is provided with outer middle short sipes 40 which connects tire axial inner ends 15Bi of the second outer middle lateral grooves 15B and the outer center circumferential groove 3D. Such an outer middle short sipe 40 can moderate distortion generated between the second outer middle lateral groove 15B and the outer center circumferential groove 3D, and effectively exert the uneven wear resistance.

Although the embodiment of the invention has been described in detail, the invention is not limited to the embodiment shown in figures and the invention can variously be modified and carried out.

EXAMPLE

Tires having the basic structure shown in FIG. 1, and having the circumferential grooves and the lateral grooves shown in Table 1 were produced, and performance levels of the tires were evaluated. For comparison, tires in which the inner shoulder lateral grooves and the outer shoulder lateral grooves shown in FIG. 5 were laterally inverted are also produced, and performance levels of the tires were evaluated likewise. Common specifications are as follows:
tire size: 225/55R17 97V
rim size: 17×7.0 JJ
tread width TW: 194 mm
circumferential groove:
 groove width W1: 8.5 mm
 groove depth D1: 9.0 mm
 ratio (W1/TW): 4.4%
 ratio (D1/TW): 4.6%
 inner shoulder circumferential groove:
 distance L1 from tire equator of groove center line: 50.5 mm
 ratio (L1/TW): 26.0%
 outer shoulder circumferential groove:
 distance L2 from tire equator of groove center line: 50.4 mm
 ratio (L2/TW): 26.0%
lateral groove:
 groove width W2: 4.9 mm
 groove depth D2: 7.5 mm
 ratio (W2/TW): 2.5%
 ratio (D2/TW): 3.9%
inner middle thin groove:
 groove width W3: 2.1 mm
 groove depth D3: 1.0 mm
 ratio (W3/TW): 1.1%
 ratio (D3/TW): 0.5%
outer middle thin groove:
 groove width W4: 2.8 mm
 groove depth D4: 2.0 mm
 ratio (W4/TW): 1.4%
 ratio (D4/TW): 1.0%
A test method is as follows:
<Drainage Performance>

The prototyped tires were mounted around the rims, an internal pressure of 230 kPa was charged into each of the tires and the tires were mounted on all of wheels of an FF vehicle of 3500 cc displacement. A puddle having a water depth of 5 mm and a length of 20 m was formed on an asphalt road having a radius of 100 m as a test course. The vehicle was made to run on the test course while increasing the speed in a step-by-step manner, and average lateral accelerations of front wheels and rear wheels at speeds of 50 to 80 km/h were measured. Results are shown with indices in which an embodiment 1 is evaluated as 100. The greater the numeric value is, the more excellent the result is.
<Uneven Wear Resistance>

The prototyped tires were mounted around the rims under the above-described conditions, and mounted on all of the wheels of the test vehicle, the vehicle was made to run 8000 km on a dry asphalt road surface, a difference between a worn amount of outer shoulder land portions and a worn amount of inner shoulder land portions was measured. The measurement was carried out at three locations on the tire circumference, and average values of all of them were measured. Results are shown with indices of reciprocals of the average values in such a manner that a value of the embodiment 1 is evaluated as 100. The larger the numeric value is, the more excellent the result is.

<H/T Wear Resistance>

The prototyped tires were mounted around the rims under the above-described conditions, and mounted on all of the wheels of the test vehicle, and the vehicle was made to run 8000 km on a dry asphalt road surface. Concerning an outer shoulder land portion, a difference between a worn amount (average value) of an external corner between a tread surface and lateral grooves which are adjacent in a tire circumferential direction and a worn amount of a central portion of a tread surface between the lateral grooves was measured. The measurement was carried out at three locations on the tire circumference, and average values of all of them were measured. Results are shown with indices of reciprocals of the average values in such a manner that a value of the embodiment 1 is evaluated as 100. The larger the numeric value is, the more excellent the result is.

TABLE 1

Figure 5:
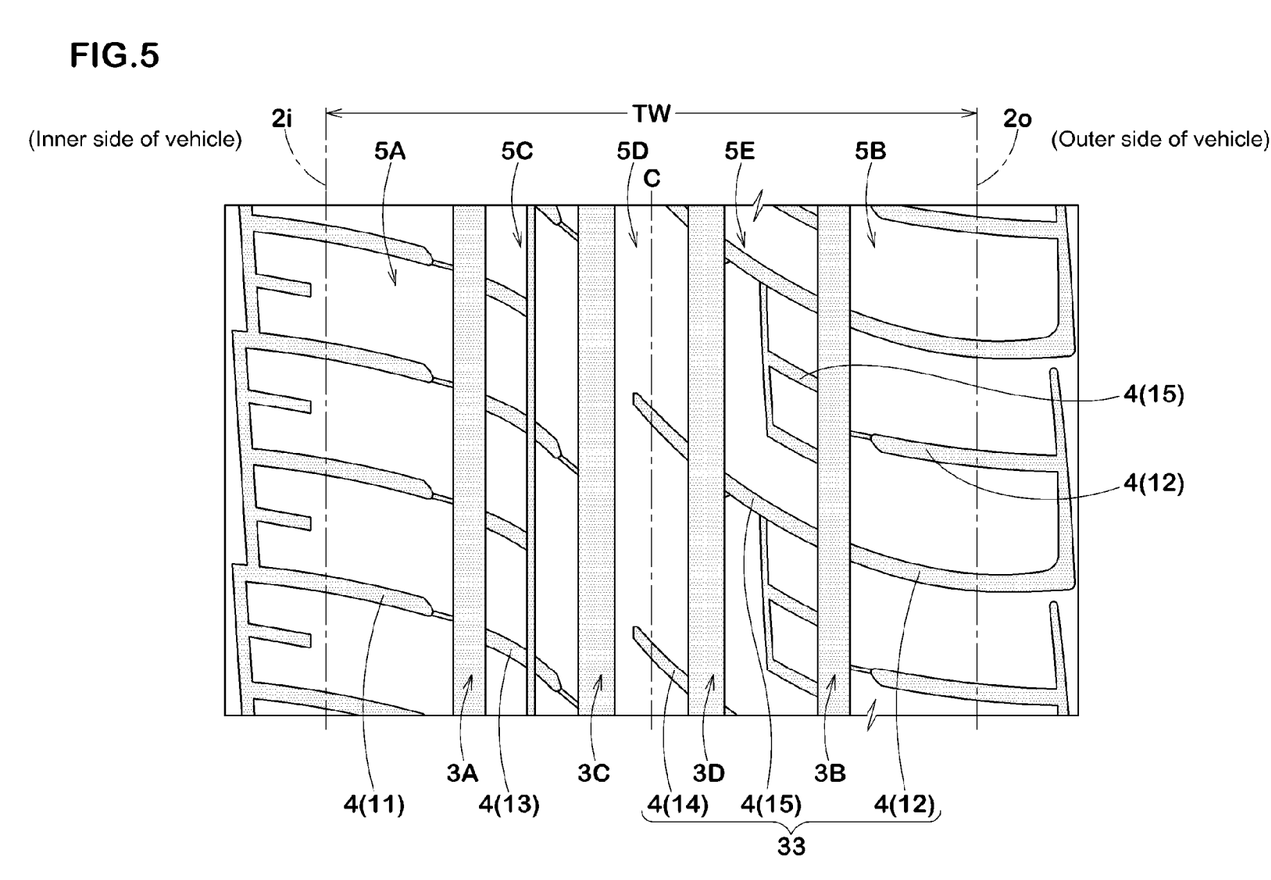
FIG. 5 is a development view of a tread portion of a pneumatic tire according to a comparative example 1.

|  | Comparative Example 1 | Example 1 | Example 2 | Example 3 | Example 4 | Example 5 | Example 6 |
| --- | --- | --- | --- | --- | --- | --- | --- |
| Development view of tread | FIG. 5 | FIG. 1 | FIG. 1 | FIG. 1 | FIG. 1 | FIG. 1 | FIG. 1 |
| Presence or absence of inner long lateral groove | Presence | Absence | Presence | Presence | Presence | Presence | Presence |
| Distance L5 between vehicle-outer side outer end of outer shoulder sipe and vehicle-outer side tread edge (mm) | — | −5 | −5 | 10 | 2.0 | 2.0 | 2.0 |
| Shortest distance L4 between inner end of outer shoulder lateral groove and outer shoulder circumferential groove (mm) | 5.9 | 2.9 | 2.9 | 2.9 | 2.9 | 5.9 | 15.5 |
| Ratio (L4/TW) (%) | 3.0 | 1.5 | 1.5 | 1.5 | 1.5 | 3.0 | 8.0 |
| Shortest distance L3 between inner end of first inner shoulder lateral groove and inner shoulder circumferential groove (mm) | 6.1 | 6.1 | 6.1 | 6.1 | 6.1 | 6.1 | 6.1 |
| Ratio (L3/TW) (%) | 3.1 | 3.1 | 3.1 | 3.1 | 3.1 | 3.1 | 3.1 |
| Groove depth D2a of inner shoulder lateral groove (mm) | 7.2 | 7.2 | 7.2 | 7.2 | 7.2 | 7.2 | 7.2 |
| Groove depth D2b of outer shoulder lateral groove (mm) | 7.2 | 7.2 | 7.2 | 7.2 | 7.2 | 7.2 | 7.2 |
| Ratio (D2a/D2b) (%) | 100 | 100 | 100 | 100 | 100 | 100 | 100 |
| Installation pitch P1 of inner long lateral groove (mm) | 38.6 | 38.6 | 38.6 | 38.6 | 38.6 | 38.6 | 38.6 |
| Installation pitch P2 of outer shoulder lateral groove (mm) | 19.3 | 19.3 | 19.3 | 19.3 | 19.3 | 19.3 | 19.3 |
| Ratio (P1/P2) (%) | 200 | 200 | 200 | 200 | 200 | 200 | 200 |
| Drainage performance (index) (the greater the numeric value is, the more excellent the result is) | 110 | 100 | 110 | 110 | 110 | 105 | 100 |

|  | Example 7 | Example 8 | Example 9 | Example 10 | Example 11 | Example 12 |
| --- | --- | --- | --- | --- | --- | --- |
| Development view of tread | FIG. 1 | FIG. 1 | FIG. 1 | FIG. 1 | FIG. 1 | FIG. 1 |
| Presence or absence of inner long lateral groove | Presence | Presence | Presence | Presence | Presence | Presence |
| Distance L5 between vehicle-outer side outer end of outer shoulder sipe and vehicle-outer side tread edge (mm) | 2.0 | 2.0 | 2.0 | 2.0 | 2.0 | 2.0 |
| Shortest distance L4 between inner end of outer shoulder lateral groove and outer shoulder circumferential groove (mm) | 5.9 | 5.9 | 5.9 | 5.9 | 5.9 | 5.9 |
| Ratio (L4/TW) (%) | 3.0 | 3.0 | 3.0 | 3.0 | 3.0 | 3.0 |
| Shortest distance L3 between inner end of first inner shoulder lateral groove and inner shoulder circumferential groove (mm) | 1.9 | 15.5 | 6.1 | 6.1 | 6.1 | 6.1 |
| Ratio (L3/TW) (%) | 1.0 | 8.0 | 3.1 | 3.1 | 3.1 | 3.1 |
| Groove depth D2a of inner shoulder lateral groove (mm) | 7.2 | 7.2 | 7.2 | 7.2 | 7.2 | 7.2 |
| Groove depth D2b of outer shoulder lateral groove (mm) | 7.2 | 7.2 | 9.0 | 6.5 | 7.2 | 7.2 |
| Ratio (D2a/D2b) (%) | 100 | 100 | 80 | 110 | 100 | 100 |
| Installation pitch P1 of inner long lateral groove (mm) | 38.6 | 38.6 | 38.6 | 38.6 | 29.0 | 48.3 |
| Installation pitch P2 of outer shoulder lateral groove (mm) | 19.3 | 19.3 | 19.3 | 19.3 | 19.3 | 19.3 |
| Ratio (P1/P2) (%) | 200 | 200 | 200 | 200 | 150 | 250 |
| Drainage performance (index) (the greater the numeric value is, the more excellent the result is) | 110 | 100 | 110 | 100 | 105 | 100 |

As a result of the test, it could be confirmed that each of tires of the embodiments could enhance the uneven wear resistance while maintaining the drainage performance.

What is claimed is:

1. A pneumatic tire comprising:
   a tread portion provided with a left-right asymmetric tread pattern having a designated mounting orientation with respect to a vehicle, and having a vehicle-inner side tread edge and a vehicle-outer side tread edge,
   the left-right asymmetric tread pattern comprising:
   at least two circumferential grooves extending in a tire circumferential direction; and
   lateral grooves extending crosswise to the tire circumferential direction, and said at least two circumferential grooves including:
   an inner shoulder circumferential groove disposed on an innermost side of the tread portion with respect to the vehicle; and
   an outer shoulder circumferential groove disposed on an outermost side of the tread portion with respect to the vehicle,
   wherein said lateral grooves include:
   inner shoulder lateral grooves extending between the inner shoulder circumferential groove and the vehicle-inner side tread edge; and
   outer shoulder lateral grooves extending between the outer shoulder circumferential groove and the vehicle-outer side tread edge,
   wherein the inner shoulder lateral grooves include:
   first inner shoulder lateral grooves extending from an outer side of the vehicle-inner side tread edge toward the inner shoulder circumferential groove and terminating without reaching the inner shoulder circumferential groove;
   second inner shoulder lateral grooves extending from an outer side of the vehicle-inner side tread edge to the inner shoulder circumferential groove so as to open to the inner shoulder circumferential groove, and
   the first inner shoulder lateral grooves and the second inner shoulder lateral grooves are arranged alternately in the tire circumferential direction,
   wherein the outer shoulder lateral grooves extend from an outer side of the vehicle-outer side tread edge towards the outer shoulder circumferential groove and terminating without reaching the outer shoulder circumferential groove,
   wherein the tread pattern further comprises:
   an outer short sipe connecting between the axially inner end of each of the outer shoulder lateral grooves and the outer shoulder circumferential groove;
   an outer shoulder sipe disposed between every two of the outer shoulder lateral grooves and having closed ends within a region between the outer shoulder circumferential groove and the vehicle-outer side tread edge;
   wherein a part of the tread pattern between the outer shoulder circumferential groove and the vehicle-outer side tread edge consists of the outer shoulder lateral grooves, the outer shoulder sipes and the outer short sipes; and
   inner shoulder sipes each extending from an inner side of the vehicle-inner side tread edge toward the inner shoulder circumferential groove and terminating without reaching the inner shoulder circumferential groove,
   wherein between every two of the circumferentially adjacent first and second inner shoulder lateral grooves, only one of the inner shoulder sipes is disposed.

2. The pneumatic tire according to claim 1, wherein the depth of the inner shoulder sipe is smaller than the depth of the outer shoulder sipe.

3. The pneumatic tire according to claim 2, wherein the groove depth of the inner shoulder lateral grooves is smaller than the groove depth of the outer shoulder lateral grooves.

4. The pneumatic tire according to claim 2, which is provided on the outside of the tread portion with outer shoulder slots each extending from a position outside the vehicle-outer side tread edge toward the outside of said position.

5. The pneumatic tire according to claim 2, wherein said at least two circumferential grooves further include:
   an inner center circumferential groove disposed between the tire equator and the inner shoulder circumferential groove; and
   an outer center circumferential groove disposed between the tire equator and the outer shoulder circumferential groove, and
   said lateral grooves further include:
   inner middle lateral grooves extending between the inner shoulder circumferential groove and the inner center circumferential groove; and
   center lateral grooves extending from the inner center circumferential groove beyond the tire equator and terminate without reaching the outer center circumferential groove, and
   wherein the inner middle lateral groove and the center lateral groove and said second inner shoulder lateral groove are smoothly connected to each other through the inner center circumferential groove and the inner shoulder circumferential groove.

6. The pneumatic tire according to claim 1, wherein the groove depth of the inner shoulder lateral grooves is smaller than the groove depth of the outer shoulder lateral grooves.

7. The pneumatic tire according to claim 6, which is provided on the outside of the tread portion with outer shoulder slots each extending from a position outside the vehicle-outer side tread edge toward the outside of said position.

8. The pneumatic tire according to claim 6, wherein said at least two circumferential grooves further include:
   an inner center circumferential groove disposed between the tire equator and the inner shoulder circumferential groove; and
   an outer center circumferential groove disposed between the tire equator and the outer shoulder circumferential groove, and
   said lateral grooves further include:
   inner middle lateral grooves extending between the inner shoulder circumferential groove and the inner center circumferential groove; and
   center lateral grooves extending from the inner center circumferential groove beyond the tire equator and terminate without reaching the outer center circumferential groove, and
   wherein the inner middle lateral groove and the center lateral groove and said second inner shoulder lateral groove are smoothly connected to each other through the inner center circumferential groove and the inner shoulder circumferential groove.

9. The pneumatic tire according to claim 1, which is provided on the outside of the tread portion with outer shoulder slots each extending from a position outside the vehicle-outer side tread edge toward the outside of said position.

10. The pneumatic tire according to claim 1, wherein said at least two circumferential grooves further include:

an inner center circumferential groove disposed between the tire equator and the inner shoulder circumferential groove; and an outer center circumferential groove disposed between the tire equator and the outer shoulder circumferential groove, and said lateral grooves further include:

inner middle lateral grooves extending between the inner shoulder circumferential groove and the inner center circumferential groove; and center lateral grooves extending from the inner center circumferential groove beyond the tire equator and terminate without reaching the outer center circumferential groove, and wherein the inner middle lateral groove and the center lateral groove and said second inner shoulder lateral groove are smoothly connected to each other through the inner center circumferential groove and the inner shoulder circumferential groove.

11. The pneumatic tire according to claim 1, wherein the tread portion is provided with inner short sipes connecting between the inner shoulder circumferential groove and the adjecent ends of the first inner shoulder lateral grooves, and outer short sipes connecting between the outer shoulder circumferential groove and the adjacent ends of the outer shoulder lateral grooves.

12. The pneumatic tire according to claim 1, wherein
said at least two circumferential grooves further include an inner center circumferential groove disposed between the tire equator and the inner shoulder circumferential groove, the tread pattern further comprises first inner middle lateral grooves and second inner middle lateral grooves disposed between the inner shoulder circumferential groove and the inner center circumferential groove, wherein the second inner middle lateral grooves extend from the inner shoulder circumferential groove to the inner center circumferential groove, and the first inner middle lateral grooves extend from the inner shoulder circumferential groove toward the inner center circumferential groove and terminate without reaching the inner center circumferential groove, and between every two of the circumferentially adjacent second inner middle lateral grooves, two of the first inner middle lateral grooves are disposed, the tread pattern further comprises an inner middle thin groove extending from one of axial inner ends of said two of the first inner middle lateral grooves to the other, and further extending to one of the second inner middle lateral grooves.

13. The pneumatic tire according to claim 12, wherein
said at least two circumferential grooves further include an outer center circumferential groove disposed between the tire equator and the outer shoulder circumferential groove, the tread pattern further comprises:

an outer middle thin groove disposed between the outer center circumferential groove and the outer shoulder circumferential groove and extending continuously in the tire circumferential direction, outer middle lateral grooves extending from the outer middle thin groove to the outer shoulder circumferential groove, second outer middle sipes with both ends closed disposed between the outer middle thin groove and the outer shoulder circumferential groove, and first outer middle sipes extending from the outer middle thin groove to the outer center circumferential groove.

14. The pneumatic tire according to claim 13, wherein
the tread pattern further comprises first center sipes and second center sipes disposed between the inner center circumferential groove and the outer center circumferential groove, wherein the first center sipe has an end opened to the inner center circumferential groove and an closed end, and the second center sipe has an end opened to the outer center circumferential groove and a closed end.

* * * * *